United States Patent
Komatsubara et al.

(10) Patent No.: US 6,581,404 B2
(45) Date of Patent: Jun. 24, 2003

(54) REFRIGERANT

(75) Inventors: Takeo Komatsubara, Kiryu (JP); Yasuki Takahashi, Gunma-ken (JP); Takayuki Saitou, Ota (JP); Miyuki Kawamura, Gunma-ken (JP)

(73) Assignee: Sanyo Electric Co., Ltd., Ohsaka-Fu (JP)

( * ) Notice: Subject to any disclaimer, the term of this patent is extended or adjusted under 35 U.S.C. 154(b) by 0 days.

(21) Appl. No.: 10/217,870

(22) Filed: Aug. 13, 2002

(65) Prior Publication Data

US 2002/0194862 A1 Dec. 26, 2002

Related U.S. Application Data

(62) Division of application No. 09/908,760, filed on Jul. 19, 2001.

(30) Foreign Application Priority Data

Jul. 27, 2000 (JP) .................................. 2000-227678

(51) Int. Cl.[7] ................................................. F25B 43/00
(52) U.S. Cl. ............................. 62/474; 62/502; 252/68
(58) Field of Search ...................... 62/474, 502, 114; 252/68

(56) References Cited

U.S. PATENT DOCUMENTS 5,443,745 A * 8/1995 Sakamoto et al. ........ 252/52 A
5,910,161 A * 6/1999 Fujita et al. .................. 62/211

FOREIGN PATENT DOCUMENTS

| EP | 1 094 100 A1 |   | 4/2001 |   |
| GB | 2089834 A | * | 6/1982 | .......... C10K/3/00 |
| JP | 8-176536 |   | 7/1996 |   |
| JP | 2000-104049 | * | 4/2000 | .......... C09K/5/04 |
| JP | 02000319647 A | * | 11/2000 | .......... F25B/1/00 |

* cited by examiner

Primary Examiner—Denise L. Esquivel
Assistant Examiner—Marc Norman
(74) Attorney, Agent, or Firm—Knobbe Martens Olson & Bear LLP

(57) ABSTRACT

An object of the present invention is to provide a refrigerant in which an odorant is added, the odorant being compatible with refrigerants and refrigerating device oils, and having no reactivity with refrigerating device oils and materials forming refrigerating circuits, and to provide a refrigerating device in which the refrigerant is circulated in the refrigerating circuit.

A refrigerant whose main component is a hydrocarbon having 1 to 4 carbon atoms, or a flammable hydrocarbon fluoride obtained when one or more hydrogen atoms of the hydrocarbon is substituted by fluorine atoms, the refrigerant containing a tetrahydrothiophene as an odorant, and a refrigerating device in which the refrigerant is circulated are provided.

2 Claims, 1 Drawing Sheet

REFRIGERANT

This is a divisional of U.S. application Ser. No. 09/908,760 filed Jul. 19, 2001, which claims priority based on Japanese Patent Application No. 2000-227678 filed Jul. 27, 2000, and the complete disclosure of which is hereby incorporated by this reference thereto.

BACKGROUND OF THE INVENTION

1. Field of the Invention

The present invention relates to a refrigerant and a refrigerating device, and in particular, to a flammable refrigerant in which an odorant is incorporated and a refrigerating device which utilizes the flammable refrigerant.

2. Description of the Related Art

Refrigerators and refrigerating devices for automatic vending machines and showcases have usually used, as a conventional refrigerant, chlorofluorocarbon refrigerants such as dichlorodifluoromethane (CFC-12), or hydrochlorofluorocarbon refrigerants such as chlorodifluoromethane (HCFC-12). When these refrigerants are released into the atmosphere and reach the ozone layer above the earth, the problem of destruction of the ozone layer arises. Thus, use of chlorofluorocarbon flon and hydrochlorofluorocarbon flon, which are refrigerants which have been used until now in refrigerating devices, has been prohibited or restricted.

As a result, hydrofluorocarbon refrigerants such as $CH_2FCF_3$ (HFC-134a) have been used as a substitute flon of the above refrigerants. However, even with such HFC refrigerants, a problem arises in that the effect thereof on global warming, which is another global environmental issue, is near the same level as that of the conventional HCFC-22 ($CHClF_2$) which is an HCFC refrigerant.

To solve such problems, hydrocarbon (HC) refrigerants such as propane and isobutane have recently been used as refrigerants for refrigerating devices. However, because the HC refrigerants are flammable, there is the possibility of spontaneous ignition or explosion when these refrigerants leak from a refrigerating circuit. Particularly, in the case of home refrigerators, since many heat sources often disposed near the home refrigerator, leakage of the flammable refrigerant may cause a major accident.

In view of the aforementioned facts, for refrigerating devices which utilize flammable gas refrigerants, it has been proposed to add odorants to refrigerants so that the leakage of the gas refrigerants can be detected. For example, Japanese Patent Application Laid-Open (JP-A) No. 8-14675 discloses addition of methylmercaptan, as an odorant made of sulfur-containing organic substance, to the HC refrigerant. However, methylmercaptan has high reactivity with copper, which is a material used in the refrigerating circuit, and changes (corrodes) the copper surface, which results in a shortened life of the copper. In addition, methylmercaptan also has high reactivity with refrigerating device oils. When it reacts with the refrigerating device oil, an insoluble reaction product will be generated in the refrigerant or in the refrigerating device oil, which insoluble reaction product may cause clogging of a capillary tube or the like in the refrigerating circuit after operation for a long period of time.

JP-A No. 8-245952 discloses that, in addition to mercaptane (methyl mercaptane, ethylmercaptane), dimethyl sulfide is added, as an odorant, to a flammable HFC refrigerant. However, dimethyl sulfide does not have an extremely strong offensive smell (it only has an onion-like smell), so that dimethyl sulfide alone does not sufficiently function as an odorant for the flammable refrigerant. As a result, it is generally used in combination with other odorants such as mercaptanes.

Therefore, a flammable refrigerant incorporating an odorant which odorant has no reactivity with copper, a material of the refrigerating circuit, or refrigerating device oils has not been developed.

An odorant is generally required to have such characteristics that it has an abnormal smell, is stable as a chemical substance, is non-toxic and harmless to humans, and the like. In addition, particular characteristics are required depending on materials to which the odorant is added. Therefore, a substance known as an odorant can not always be used as the odorant for other materials.

For example, tetrahydrothiophene (THT) has already been used as an odorant in combustion gases such as town gas ("*Perfume*" No. 146, June 1985). In addition to the above characteristics generally required for odorants, the following particular characteristics are necessary for odorants used in combustion gases: it burns safely and is odorless and harmless after combustion takes place, the odor is held in the gas so as not to be absorbed by gas pipes and meters, and the like. Because adding THT to combustion gases and adding THT in refrigerants for refrigerating circuit have been considered as two different things, use of THT in refrigerants has not been examined.

SUMMARY OF THE INVENTION

In view of the aforementioned facts, an object of the present invention is to provide a refrigerant in which an odorant is added, the odorant being compatible with refrigerants and refrigerating device oils, and having no reactivity with refrigerating device oils and materials used for refrigerating circuits, and to provide a refrigerating device in which the refrigerant is circulated in the refrigerating circuit.

The following refrigerants and refrigerating devices of the present invention are provided in order to achieve the above-described object.

A first aspect of the present invention is a refrigerant the main component of which is a hydrocarbon having 1 to 4 carbon atoms, or a flammable hydrocarbon fluoride derived by substituting one or more hydrogen atoms of the hydrocarbon with fluorine atoms, the refrigerant including a tetrahydrothiophene as an odorant.

A second aspect of the present invention is the refrigerant in which the amount of the odorant is in the range of 10 wt ppm to 0.5 wt %.

A third aspect of the present invention is the refrigerant in which purity of the hydrocarbon or the flammable hydrocarbon fluoride is at least 99.0 vol %, the content of unsaturated hydrocarbon is no more than 0.01 wt %, and the entire sulfur content is no more than 0.1 wt ppm.

A fourth aspect of the present invention is a refrigerating device in which the refrigerant of the first aspect of the invention is circulated in a refrigerating circuit in which a compressor, a heat releasing device, an expansion mechanism, and an evaporator are included.

A fifth aspect of the present invention is the refrigerating device in which a refrigerating device oil used in the compressor has a viscosity at 40° C. of 5 to 300 cSt.

A sixth aspect of the present invention is the refrigerating device in which the refrigerating device oil includes a metal inactivating agent.

A seventh aspect of the present invention is the refrigerating device in which the refrigerating device oil includes one or more additives selected from the group consisting of moisture- and/or acid trapping agents, antioxidants, and extreme pressure additives.

An eighth aspect of the present invention is the refrigerating device in which residual oxygen in the refrigerating circuit is no more than 0.1 vol % of an internal capacity of the refrigerating circuit, and a residual moisture content in the refrigerating circuit is no more than 500 wt ppm with respect to a total of the refrigerant and the refrigerating device oil.

A ninth aspect of the present invention is the refrigerating device in which the refrigerating circuit is made of copper or copper alloy.

A tenth aspect of the present invention is the refrigerating device in which the refrigerating circuit further includes a drying device.

An eleventh aspect of the present invention is the refrigerating device in which the drying device contains a synthetic zeolite whose effective diameter falls in the range of 3 to 6 Å.

DESCRIPTION OF THE PREFERRED EMBODIMENTS

Figure 1:
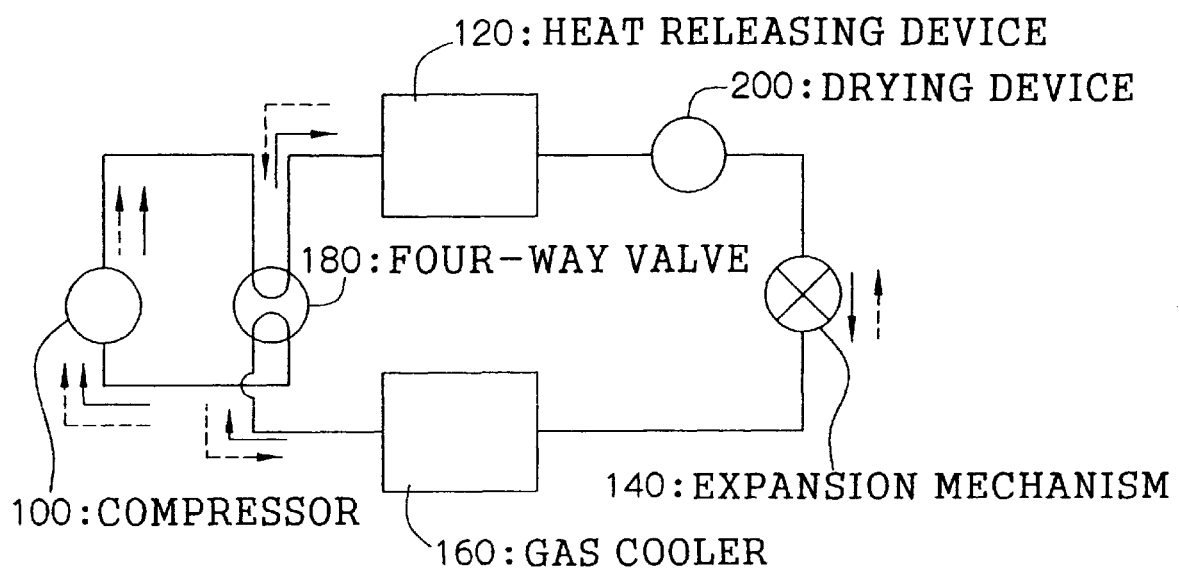
FIG. 1 is a schematic view illustrating one example of a refrigerating circuit in the present invention.

The main component of the refrigerant of the present invention is a hydrocarbon having 1 to 4 carbon atoms, or a flammable hydrocarbon fluoride in which some of the hydrogen atoms of hydrocarbon are substituted by fluorine atoms. These refrigerants are known as flammable refrigerants. Examples of the hydrocarbon having 1 to 4 carbon atoms include propane, isobutane, or the like. The flammable hydrocarbon fluoride is the hydrocarbon fluoride in which a part of hydrocarbon having 1 to 3 carbon atoms is substituted by fluorine atoms, and examples thereof include: difluoromethane, difluoroethane (1,1- or 1.2-difluoroethane), trifluoroethane (1,1,1- or 1,1,2-trifluoroethane), tetrafluoroethane (1,1,1,2- or 1,1,2,2-tetrafluoroethane), pentafluoroethane, pentafluoropropane (1,1,2,2,3- or 1,1,1,3,3-pentafluoropropane, etc.), hexafluoropropane (1,1,2,2,3,3- or 1,1,1,2,3,3-hexafluoropropane, etc.), heptafluoropropane (1,1,1,2,2,3,3- or 1,1,1,2,3,3,3-heptafluoropropane, etc.), or the like. The purity of the hydrocarbon is preferably 99.0 vol % or higher, the total amount of unsaturated hydrocarbon contained therein is preferably 0.01 wt % or less, and the entire sulfur content contained therein is preferably 0.1 wt ppm or less. If the purity of the hydrocarbon or the flammable hydrocarbon fluoride is less than 99.0 vol %, there are cases in which adverse effects due to the impurities may arise. If the total amount of unsaturated hydrocarbon exceeds 0.01 wt %, unsaturated hydrocarbon reacts with the refrigerating device oil in the refrigerating circuit and with materials forming the refrigerating circuit. As a result, deterioration of the refrigerating circuit tends to occur. Further, if the entire content of sulfur exceeds 0.1 wt ppm, the reaction with the copper forming the pipes will exceed allowable limits, which is not preferable.

Next, the odorant used in the present invention will be described. An odorant is generally required to have such characteristics that it has an abnormal offensive smell, is stable as a chemical substance, is non-toxic and harmless to humans, and the like. In addition to the above characteristics, the following particular characteristics are required for the odorant particularly for use in refrigerants: it does not react with materials, particularly copper, forming the refrigerating circuit; it is compatible with refrigerants; and it is compatible with, but does not react with the refrigerating device oil which is mixed with the refrigerant and together circulates in the refrigerating circuit. Other than these characteristics, the odorant must have an appropriate boiling point and solidifying point. If the boiling point is too high, the odorant hardly vaporizes and does not function well as an odorant. If the solidifying point is too high, the odorant solidifies in the refrigerant, which may cause clogging of the refrigerating circuit.

The odorant used in the refrigerant of the present invention is tetrahydrothiophene (hereinafter, sometimes referred to as THT). THT is a liquid substance at ordinary temperature and has a unique offensive smell (a smell like that of coal gas), a boiling point of 122° C., and a solidifying point of −96° C. Accordingly, THT sufficiently functions as an odorant in the case of leakage of the refrigerant, and, because THT does not solidify when used in refrigerants, problems such as clogging of the refrigerating circuit can be avoided. In addition, THT has good compatibility with above-described hydrocarbon, flammable hydrocarbon fluoride, and later-described refrigerating device oils. As an important characteristics, THT does not react with materials, especially copper and copper alloy, which form the refrigerating circuit. Therefore, THT does not cause corrosion of copper pipes, heat exchangers, or the like. In addition, since THT does not react with refrigerating device oils, clogging of the refrigerating circuit due to insoluble reaction products will not occur even after operation for a long period of time.

The added amount of the odorant in the refrigerant is preferably 10 wt ppm to 0.5 wt %. When less than 10 wt ppm is used, it becomes difficult to detect leakage of the refrigerant. If even more than 0.5 wt % is added, the odor becomes stronger than necessary, and, as a result, handling of the odorant becomes difficult when the odorant is filled in the refrigerant circuit and recovered therefrom. Therefore, the aforementioned range is preferable.

The present invention also relates to a refrigerating device which circulates a refrigerant through a refrigerating circuit in which a compressor, a heat releasing device, an expansion mechanism, and an evaporator are included.

FIG. 1 is a schematic view for explaining one example of a cooling circuit in the refrigerating device of the present invention. In FIG. 1, reference numeral 100 represents a compressor, 120 denotes a heat releasing device, 140 represents an expansion mechanism (a capillary tube), 160 denotes a gas cooler, 180 is a four-way valve, and 200 represents a drying device. The arrows denote the direction in which the refrigerant flows. The solid line arrows illustrate the flow of the refrigerant when the ordinary cooling is carried out, and the dashed arrows indicate the flow of the refrigerant when the defrosting is carried out. In FIG. 1, an example is illustrated in which the drying device is provided between the expansion mechanism 140 and the heat releasing device 120. However, the drying device does not have to be provided at this position, and may be provided at another low-pressure position.

For example, in a case in which the interior of a room is to be cooled, the refrigerant gas, which is under high temperature and high pressure and is compressed by the compressor 100, passes through the four-way valve 180, such that heat is released at the heat releasing device 120 and the refrigerant is cooled so as to become a low-temperature, high-pressure refrigerant liquid. The pressure of the refrigerant liquid is lowered by the expansion mechanism 140 (e.g., a capillary pipe, a temperature-type expansion valve, or the like), so as to become a low-temperature, low-pressure liquid containing a slight amount of gas. This liquid reaches the gas cooler 160, obtains heat from the air within the room, evaporates, passes through the four way valve 180, and reaches the compressor 100 to cool the interior of the room. When the gas cooler is to be defrosted, the flow of the refrigerant is changed to the opposite direction by the four way valve 180, and the opposite operations are carried out so as to defrost. When an exterior heat changer is used as the heat releasing device while an interior heat exchanger is used as the gas cooler, the present invention can also be applied to a heating and cooling type air conditioner.

The refrigerating device oil is a lubricating oil sealed within the compressor. A mixture of a refrigerant and a small amount of the refrigerating device oil circulates through the entire refrigerating circuit. Therefore, the odorant incorporated in the refrigerant is caused to be in contact with the refrigerating device oil. Accordingly, the odorant is required to be compatible with, and have no reactivity with the refrigerating device oil.

Accordingly, the low-temperature characteristic and the miscibility with respect to the refrigerant, of the refrigerating device oil are important for the performance of the cooling system. The mixture of the refrigerant and the refrigerating device oil must be stable (e.g., must be resistant to hydrolysis) at operating temperatures of the refrigerating device. Further, the mixture must not be harmful to (e.g., must not corrode or lower the insulation of) the compressor as well as the other materials used in the refrigerating circuit. Further, a portion of the refrigerating device oil is mixed in with the compressed refrigerant gas, is circulated together with the refrigerant in the refrigerating circuit of the refrigerating device, and flows into the evaporator through an expansion mechanism such a capillary pipe or an expansion valve. At the low temperature portions in the refrigerating circuit, the refrigerating device oil which moves from the compressor loses its fluidity, and the refrigerating device oil tends to remain thereat. If the refrigerating device oil does not return to the compressor from the evaporator, the level of the oil on the surfaces in the compressor will fall, and this may cause heat damage (seizing due to increased temperature).

The viscosity of the refrigerating oil at 40° C. is preferably 5 to 300 cSt. When the viscosity is greater than 300 cSt, the fluidity is insufficient, and the fluidity tends to be lost, especially at low temperatures. Further, if the viscosity is less than 5 cSt, insufficient oil film strength at the lubricating surfaces and an insufficient sealing effect at the compressor mechanism tend to occur.

Further, the volume specific resistivity of the refrigerating device oil at the refrigerating device of the present invention is preferably $10^{10}$ Ω·cm or more.

General petroleum oils, ether synthetic oils, ester synthetic oils, fluorine synthetic oils and the like can be used as the refrigerating device oil at the refrigerating device of the present invention. Examples of petroleum oils are paraffin oils and naphthene oils. Further, polyvinylethers and polyalkylene glycols may be used as the ether synthetic oils. Examples of the ester synthetic oils are polyol ester oil, carbonate ester, and the like.

A polyester from a polyvalent alcohol and a polyvalent carboxylic acid is preferably used as the ester synthetic oil. Among these, polyester oils synthesized from a fatty acid and a polyvalent alcohol selected from pentaerithritol (PET), trimethylolpropane, (TMP), and neopentylglycol (NPG) are preferably used.

In the case in which hydrocarbon is used as the refrigerant, petroleum oils are preferably used as the refrigerating device oil while in the case in which a flammable hydrocarbon fluoride is used as the refrigerant, ether synthetic oils such as polyvinylether are preferably used as the refrigerating device oils. Further, a mixture of one or more types of refrigerating device oils may be used as the refrigerating device oil.

Additives such as defoaming agents, antioxidants, moisture-and/or acid trapping agents, extreme pressure additives or antiabrasion improving agents, and metal inactivating agents, especially copper inactivating agents, may be added to the refrigerating device oil. It is preferable to use additives to prevent alterations (decomposition, oxidation, formation of sludge, and the like) of the refrigerating device oil and alterations (corrosion) of the materials forming the refrigerating circuit. In addition, heat-resistance improving agents, corrosion preventing agents, rust-preventing agents and the like may be suitably added.

The additives to the refrigerating device oil do not only have particular effects on the refrigerating device oil itself, but also consequently have certain effects on the sliding portions of the compressor, the insulating materials, and the pipe metals. One or more types of these additives may be used. Further, as described above, because a mixture of the refrigerant and a small amount of refrigerating device oil is circulated through the refrigerating circuit, the refrigerating device oil, to which the above additives are added, must not exert any harmful effects on the materials used in the refrigerating circuit.

As the defoaming agent, dimethylpolysiloxane oil, trifluoropropylmethyl silicone oil, phenylmethyl silicone oil and the like are preferably used.

The added amount of the defoaming agent is preferably 1 to 50 wt ppm with respect to the refrigerating device oil. When less than 1 wt ppm is used, the effects of the defoaming agent are insufficient. If more than 50 wt ppm is added, the effects as a defoaming agent do not increase. Therefore, the aforementioned range is preferable.

By adding the defoaming agent, when the air within the refrigerant compressor and the circuit is removed before refrigerant sealing, the amount of foam generated from the refrigerating device oil is decreased, and entry of foam into the deaerating device can be prevented. In addition, foaming occurring at the time when the air dissolved in the refrigerating device oil is removed can be prevented.

The antioxidants may be hindered phenol antioxidants such as ditertiary butylparacresol (DBPC), 2,6-di-t-butyl-4-methylphenol, 4,4'-methylenebis (2,6-di-butylphenol), 2,2'-thiobis(4-methyl-6-t-butylphenol) or the like; amine antioxidants such as P,P'-dioctyldiphenylamine, 3,7-dioctylphenothiazine, phenyl-α-naphthylamine, di(alkylphenyl)amine (wherein the alkyl group has from 4 to 20 carbon atoms), phenyl-α-naphthylamine, alkyldiphenylamine (wherein the alkyl group has from 4 to 20 carbon atoms), N-nitrosodiphenylamine, phenothiazine, N,N'-dinaphthyl-p-phenylenediamine, acridine, N-methylphenothiazine, N-ethylphenothiazine, dipyridylamine, diphenylamine, phenolamine, 2,6-di-t-butyl-α-dimethylaminoparacresol and the like; and sulfur antioxidants such as alkyl disulfides or the like. Among these, DBPC is particularly preferably used. The added amount of the antioxidant is preferably 0.1 to 0.5 wt % with respect to the refrigerating device oil. When the amount is less than 0.1 wt %, the effects as an antioxidant are insufficient. When an antioxidant is added in an amount exceeding 0.5 wt %, additional effects are not achieved. Thus, the aforementioned range is preferable.

The residual oxygen in the refrigerating circuit is preferably 0.1 vol % or less with respect to the internal volume of the refrigerating circuit.

It is preferable to add a moisture- and/or acid trapping agent to the refrigerating device oil. Water and acidic substances cause corrosion of the metals used in the compressor. In addition, water and acidic substances cause hydrolysis when an ester oil is used as the refrigerating device oil, and this frees the fatty acid components. This leads to the possibility of the refrigerating circuit being closed off due to the generation of corrosion or metallic soaps, and of hydrolysis of the ester insulating materials.

Epoxy compounds, carbodiimide compounds, and the like may be used as the moisture- and/or acid trapping agent. The epoxy compounds may trap radicals. Examples of the epoxy compounds are glycidyl esters, glycidyl ethers, and the like. For example, a phenylglycidyl ether type epoxy compound or an epoxydated fatty acid monoester or the like may be used. Phenylglycidyl ether or alkylphenylglycidyl ether, for example, may be used. The alkylphenylglycidyl ether has 1 to 3 alkyl groups having 1 to 13 carbon atoms. Examples of the epoxidated fatty acid monoesters are esters of an epoxidated fatty acid having 12 to 20 carbon atoms, and an alcohol having 1 to 8 carbon atoms or a phenol or alkylphenol. In particular, esters of butyl, hexyl, benzyl, cyclohexyl, methoxyethyl, octyl, phenyl or the like of epoxystearic acid are preferable. The added amount of the moisture- and/or acid-trapping agent is preferably 0.1 to 0.5 wt % with respect to the refrigerating device oil. When the amount is less than 0.1 wt %, the effect as a trapping agent is insufficient. When the amount is greater than 0.5 wt %, polymers tend to be generated. Thus, the above range is preferable. It is preferable that the residual moisture is 500 wt ppm or less, and more preferably 200 wt ppm or less, with respect to the total of the refrigerant and the refrigerating device oil. By using a moisture-trapping agent such as those mentioned above, the equilibrium moisture content within the refrigerating circuit, which content is expressed by the following formula, can be kept to 200 wt ppm or less in the initial stags of operation of the refrigerating device. When the moisture contents exceeds 500 wt ppm, icing tends to occur within the capillary pipes. Further, hydrolysis, which is caused when a polyester oil is used as the refrigerating device oil, and the generation of metal soap sludge which accompanies such hydrolysis, can be suppressed.

[(residual moisture amount within refrigerating circuit)/(amount of oil filled+amount of refrigerant filled)]×10$^6$ wt ppm   Formula 1

For example, a tertiary phosphate phosphorus compound which is thermally stable, such as triphenylphosphate (TPP) or tricresylphosphate (TCP), or the like may be used as the extreme pressure additive. Among these, TCP is particularly preferably used.

The added amount of the extreme pressure additive is preferably 0.1 to 2 wt % with respect to the refrigerating device oil. If the amount is less than 0.1 wt %, the effects as an extreme pressure additive are insufficient. If the added amount exceeds 2 wt %, no additional effects are exhibited, and therefore, the above range is preferable.

Examples of the metal (particularly, copper) inactivating agent are benzotriazole (BTA), triazole, triazole derivatives, thiadiazole, thiadiazole derivatives, dithiocarbamate, alizarin, qunizarin, and the like. Among these, BTA is preferably used.

The added amount of the metal inactivating agent is preferably 1 to 100 wt ppm with respect to the refrigerating device oil. If the amount is less than 1 wt ppm, the effects as a metal inactivating agent are insufficient. If the added amount exceeds 100 wt ppm, no additional effects are obtained. Therefore, the above range is preferable.

The drying agent is preferably a synthetic zeolite or the like. Among synthetic zeolites, sodium A type synthetic zeolite and potassium A type synthetic zeolite are preferable. Further, in order for the zeolite particles to effectively trap the moisture within the refrigerating circuit, it is preferable for the effective diameter thereof to fall in the range of 3 to 6 Å.

The drying device used in the refrigerating device may be one in which the drying agent is accommodated within a container, and the container is connected by a pipe to the refrigerating circuit.

Hereinafter, the present invention will be described specifically by an Example. However, it is to be noted that the present invention is not limited to this example.

EXAMPLE 1

A refrigerating device was assembled by using materials such as the following, by using the refrigerating circuit shown in FIG. 1.

refrigerant: isobutane (purity 99.7 vol %, 0.001 wt % of unsaturated hydrocarbon, 0.05 wt ppm of sulfur)

odorant: tetrahydrothiophene (0.1 wt % with respect to the refrigerant)

refrigerating device oil: paraffin oil
viscosity (40° C.):15 cSt
volume specific resistivity: $10^{15}$ Ω·cm refrigerating device oil aditives (added amount is wt % with respect to refrigerating device oil)
defoaming agent: silicone defoaming agent (10 ppm)
antioxidant: DBPC (0.3%)
moisture- and/or acid-trapping agent: epoxy compound (0.25%)
extreme pressure additive: TCP (1%)
copper inactivating agent: BTA (5 ppm)

drying agent: synthetic zeolite (effective diameter: 3 Å)

The above refrigerant had a unique smell (a smell like that of coal gas), and it was easy to detect the leakage of the refrigerant even in a small amount. Further, after operation of the above refrigerating device for 2000 hours, the state of the inner surface of the copper pipe of the refrigerating circuit and the inner surface of the capillary tube were inspected, and were found to have no corrosion.

As described above, in the refrigerant of the present invention, by using tetrahydrothiophene as the odorant and due to its smell, it is easy to detect the leakage of the refrigerant from the refrigerating device. In addition, the odorant has good reactivity with the refrigerant and the refrigerating device oil. In particular, the refrigerant does not react with copper forming the refrigerating circuit, and causes no corrosion at the surface of the copper. Further, the refrigerant has no reactivity with the refrigerating device oil. Therefore, clogging of the refrigerating circuit due to insoluble reaction products will not occur even after operation for a long period of time.

What is claimed is:

1. A refrigerant comprising:
(i) a hydrocarbon having 1 to 4 carbon atoms, or a flammable hydrocarbon fluoride having a structure derived by fluorine atoms for one or more hydrogen atoms of said hydrocarbon, as a main component, and (ii) a tetrahydrothiophene as an odorant, wherein purity of the hydrocarbon or the flammable hydrocarbon fluoride is at least 99.0 vol %, the content of unsaturated hydrocarbon is no more than 0.01 wt %, and the entire sulfur content is no more than 0.1 wt ppm.

2. A refrigerant comprising:

(i) a hydrocarbon having 1 to 4 carbon atoms, or a flammable hydrocarbon fluoride having a structure derived by substituting fluorine atoms for one or more hydrogen atoms of said hydrocarbon, as a main component, and (ii) a tetrahydrothiophene as an odorant, wherein the amount of the odorant is in the range of 10 wt ppm to 0.5%, purity of the hydrocarbon or the flammable hydrocarbon fluoride is at least 99.0 vol %, the content of unsaturated hydrocarbon is no more than 0.01 wt %, and the entire sulfur content is no more than 0.1 wt ppm.

* * * * *